United States Patent [19]

Alioth

[11] Patent Number: 5,353,172
[45] Date of Patent: Oct. 4, 1994

[54] METHOD OF HELICAL TAPE TRACKING ADJUSTMENT USING HISTOGRAM OF SIGNAL QUALITY VERSUS TAPE ADVANCE DISTANCE

[76] Inventor: Henry L. Alioth, 2402 La Plancha La., Carlsbad, Calif. 92009-9127

[21] Appl. No.: 971,196

[22] Filed: Nov. 4, 1992

[51] Int. Cl.$^5$ ............... G11B 15/467; G11B 15/52; G11B 21/04
[52] U.S. Cl. .................................. 360/70; 360/10.2
[58] Field of Search .................. 360/71, 10.2, 31, 53, 360/54, 68, 70, 77.13, 77.14; 340/173 LM; 369/43

[56] References Cited

U.S. PATENT DOCUMENTS

| | | | |
|---|---|---|---|
| 4,426,665 | 1/1984 | Bradford et al. | 360/10.2 |
| 4,447,835 | 5/1984 | Smith | 360/10.2 |
| 4,882,634 | 11/1989 | Satoh et al. | 360/10.2 |
| 4,910,613 | 3/1990 | Mabuchi et al. | 360/10.1 |
| 5,057,949 | 10/1991 | Suga et al. | 360/70 |
| 5,121,263 | 6/1992 | Kerwin et al. | 360/31 X |
| 5,231,547 | 7/1993 | Noguchi et al. | 360/70 |
| 5,255,134 | 10/1993 | Sekiya et al. | 360/70 |

OTHER PUBLICATIONS

Sony Basic Video Recording Course Booklet #6 (1979) published by Video Technical Information.

*Primary Examiner*—Aristotelis Psitos
*Assistant Examiner*—Jim Habermehl
*Attorney, Agent, or Firm*—Page Lohr Associates

[57] ABSTRACT

An invention for positioning information tracks that are on a recording medium so that the scan path of a replay transducer is aligned with respect to those tracks has been discovered. The invention relieves tracking systems of the requirements of having dedicated servo heads, servo tracks, embedded servo recordings or preformatting procedures. A replay transducer "looks" for a synchronization mark on a data track to arrive at a prescribed time determined in a calibration step. The correct arrival time of the synchronization mark assures the correct positioning of the data track with respect to the scan path. Alternatively, an early or late arrival time signals an incorrect position and triggers a correction adjustment to the recording medium advancement mechanism.

4 Claims, 4 Drawing Sheets

METHOD OF HELICAL TAPE TRACKING ADJUSTMENT USING HISTOGRAM OF SIGNAL QUALITY VERSUS TAPE ADVANCE DISTANCE

BACKGROUND OF THE INVENTION

The current invention is concerned with the record and replay of stored information. In common magnetic information storage systems, the information is usually recorded along a line called a track. During replay, it is necessary to accurately follow the information track with a playback transducer. Various methods of following the information track, or "tracking", are used in information storage systems. The scheme in which the tracks are placed may affect the method of tracking. For example, tracks on computer disks follow concentric paths, and tracks on video tape are linear and are adjacent to each other. One linear format, called helical-scan format, is most commonly used with video cassette recorders, VCRs. The recording medium in VCRs, usually a long continuous tape, may have been recorded on a machine that is different from the playback machine. Tracking systems must therefore be machine independent. To accomplish machine independent tracking, a portion of the recording medium is reserved for a control track. The control track, which is free from playback information, has position information encoded on it to help the tracking system correctly position the tape with respect to the playback transducer scan path. The control track requires space on the magnetic tape that could otherwise be used for information. It is a disadvantage to use the recording medium in this way because it limits the amount of useful information that can be stored on a cassette. The information in the control track is read by a second transducer called a servo head which is dedicated to this purpose. The electronics to support the dedicated servo head, the servo head, and the extra space required by the control track on the recording medium, are all necessary for many tracking systems.

Depending upon the application, the degree of accuracy required of the tracking mechanism varies. Some of the newer formats used for recording and playing of information at very high bandwidth, require higher recording densities at higher track densities and at higher head velocities.

Some such systems have an improved tracking system, which also has the benefit of eliminating the wasted space of a control track. The control information consists of deep-layer low frequency tone recordings, usually beneath and between the information tracks, which are recorded at high density, near the surface of the media. This scheme provides separation between the servo and the information. Some such systems still require Pre-formatting of the recording medium.

SUMMARY OF THE INVENTION

An improved method and apparatus for following information tracks on recording medium has been discovered and is described herein. The invention overcomes problems found in the prior art and displaces the limitations imposed by those problems. Namely, the invention can be used with helical scanned type systems to record and replay digital or analog information, or both. Furthermore, the invention includes a simplified apparatus in comparison with known art. Specifically, the improved system does not require: dedicated servo reading transducers, servo electronics, control tracks, embedded servo control recordings, or Pre-formatting of the medium; yet, does provide highly accurate tracking that is required for replay of recorded information at high densities.

PREFERRED EMBODIMENTS OF THE INVENTION

Figure 1A:
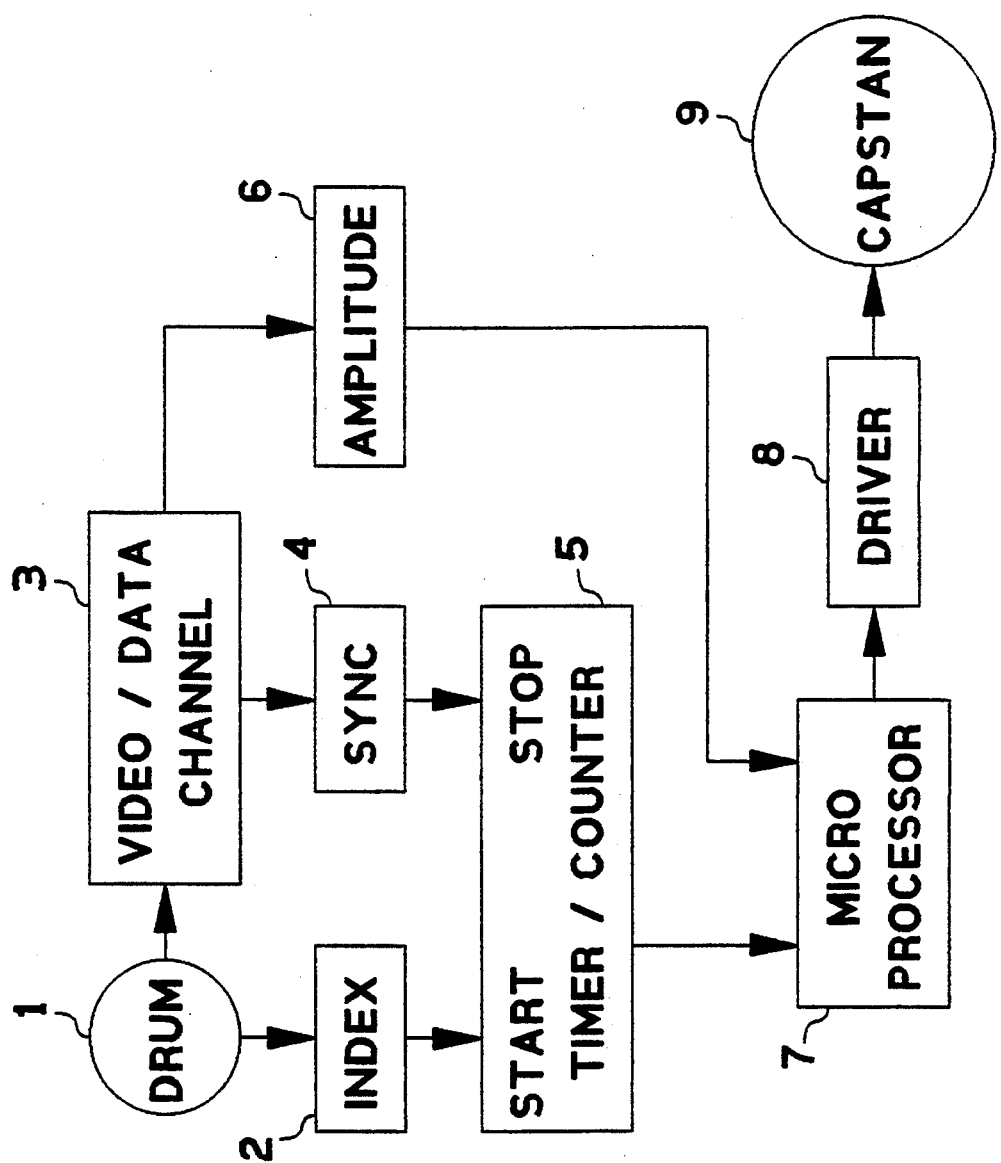
FIG. 1a depicting an amplitude calibration method and FIG. 1b an error rate calibration method.
Figure 1B:
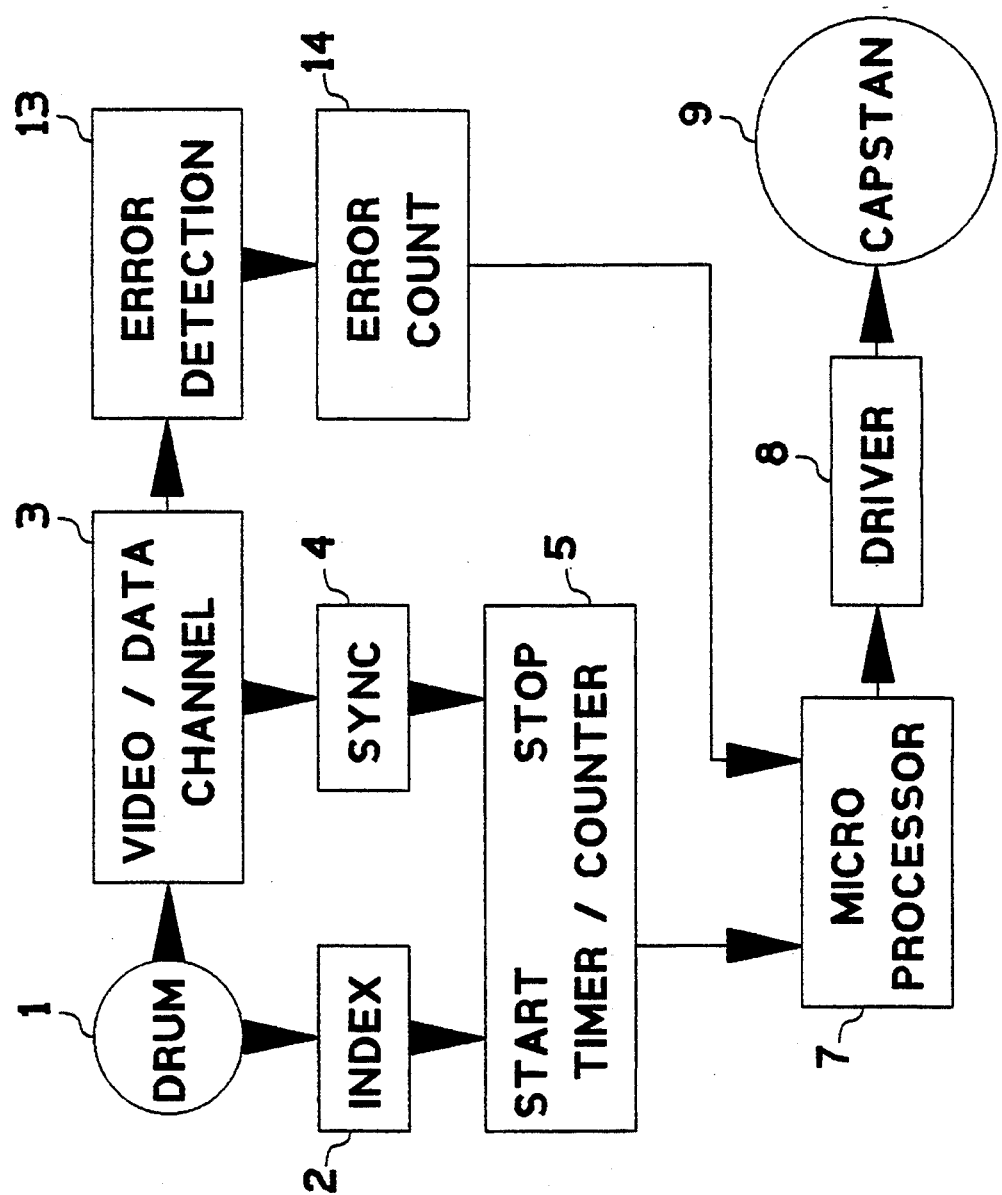
FIG. 1 is a system flow schematic.
Figure 2:
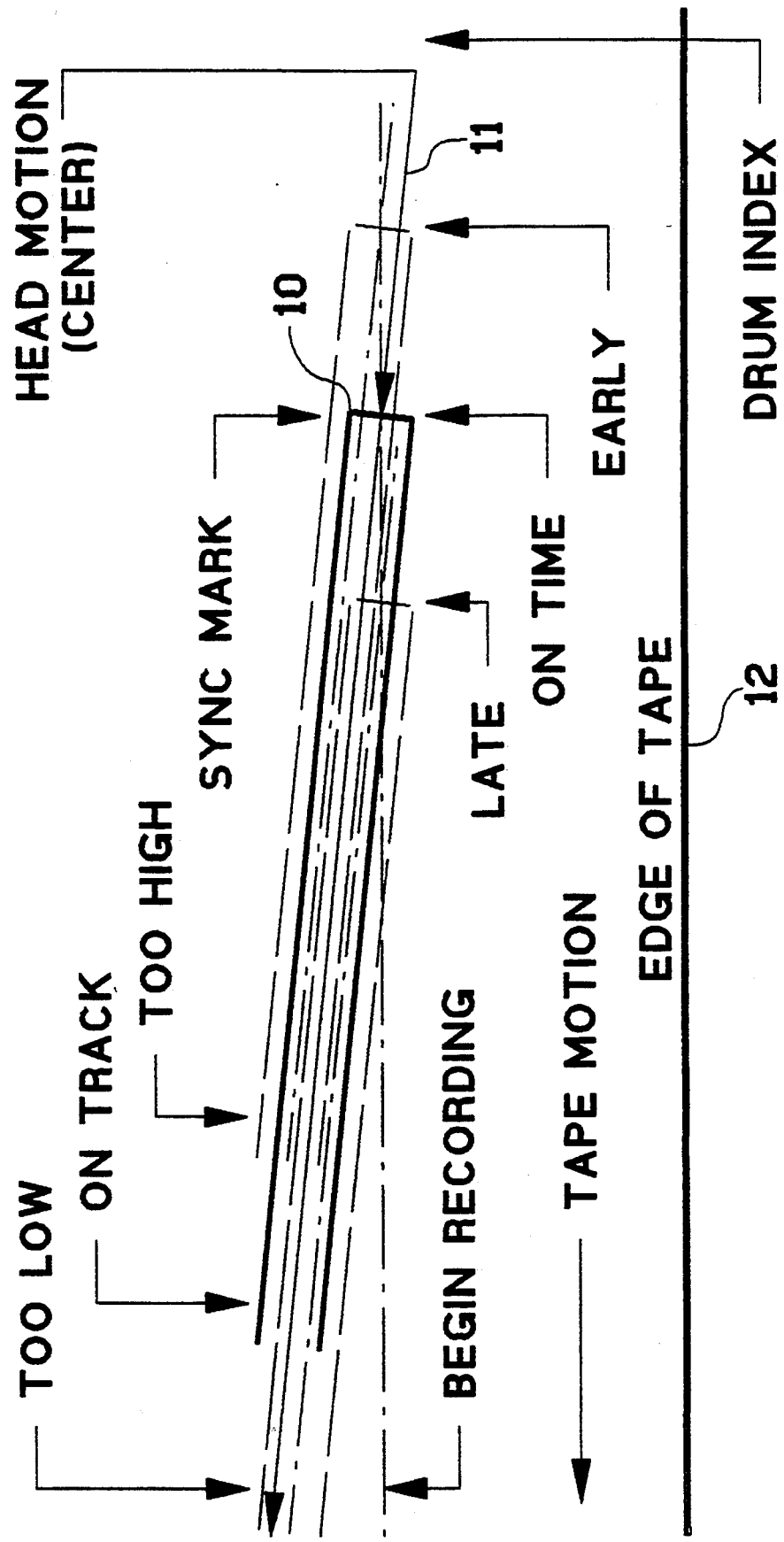
FIG. 2 is superposition drawing of possible positions of the track with respect to the playback transducer scan path.
Figure 3:
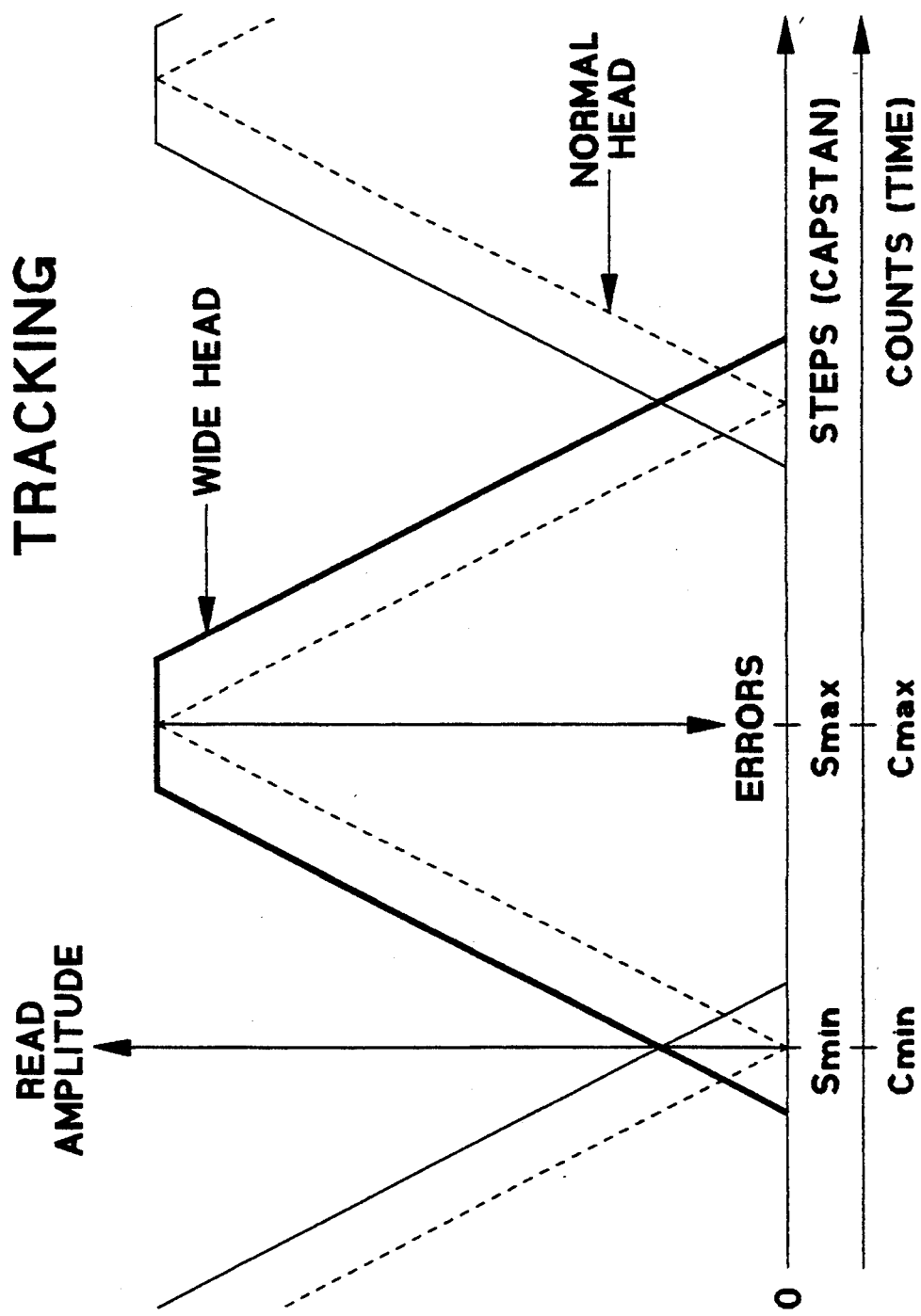
FIG. 3 illustrates the read signal amplitude or error probability as a function of track position.

To properly read information recorded along an information track, a playback transducer, sometimes called a read head, must accurately scan along the information track. If the path of the read head is not aligned well to the recorded information track, read errors can occur or the signal strength can be diminished. Since the path of the read head is necessarily fixed, it is required to dynamically adjust the position of the information track during playback operation.

During playback, a tracking system controls the position of the information tracks being played. If the recording medium advancement mechanism, usually a capstan motor 9, over-advances or under-advances the recording medium 12, the tracks begin to line-up too high or too low with respect to the read head scan path 11. To correct the conditions "too high" or "too low", it is not necessary to actually adjust the path of the recording medium in a direction transverse (up/down) to the recorded track. Instead, a track can be raised or lowered simply by increasing or decreasing the increment by which the recording medium is advanced along the direction of its travel. This is due to the fact that in helically recorded formats, the information track is recorded along a line that is at an angle with respect to the direction of recording medium advance; a displacement in the direction of advance yields an effective displacement in the transverse position of the information track. This is well known in the art.

An important feature of the invention lies in the novel detection of a mal-aligned track. It is no longer necessary for a control track to be used to measure the position of an information track, and control tracks have been eliminated. Instead, an appropriately placed synchronization mark 10 is recorded directly on the information track. Although the synchronization mark can be placed anywhere along the information track, and a plurality of them can be used in a single track, it is convenient to place a mark at the beginning of the track as is shown in the drawing.

A second mark, an index mark, is fixed to the drum 1 in which the read head rotates. An index signal 2 is produced when the read head passes a Pre-selected point on the drum. The index signal can be generated by a separate transducer. A synchronization signal 4 is produced by interaction of the read head when passing the synchronization mark recorded onto the recording medium. Detection of the index signal indicates the position of the read head and signals the start of a scan. A timer 5 measures the amount of time between the index signal and detection of the synchronization signal. Because the read head travels at a constant speed, the time measurement indirectly implies a position of the information track.

In a comparison means 7, the measured time value is compared to a reference time value stored in a reference memory. If it is equal to the reference time, the recording medium has been properly advanced and the following capstan advance increment is not adjusted. If the time is too short (the synchronization signal arrives early), the recording medium has not been advanced far enough and the information track will appear too high with respect to the scan path of the read head. The capstan motor advance increment is increased by an adjustment means 8 so that the following track will appear lower. If the synchronization signal arrives late, the information track appears too low and the advance increment is decreased to affect correction.

Accordingly, in a first aspect of the invention, an apparatus for information tracking in systems having information recorded in a helical format wherein the apparatus comprises:

a) a information reading transducer;
b) a measurement means;
c) a comparison means; and
d) an adjustment means, said information reading transducer being responsive to a synchronization signal recorded onto a recording medium, and being responsive to a signal produced at a drum index, and being in electrical contact with said measurement means;

said measurement means for measuring the time between said index signal and said synchronization signal;

said comparison means for comparing the results of the time measurement means to a previously determined reference time, and for generating an error signal based on that comparison;

said adjustment means for variably adjusting a medium advance mechanism in accordance with the error signal generated by said comparison means, is provided.

It is a second aspect of the invention to provide a method for information tracking in systems having information recorded in a helical format wherein the method comprises:

a) a measuring step to measure the time between an index signal and a synchronization signal;
b) a computing step to compute an error signal based on the measurement made in said measuring step; and
c) an adjusting step to adjust the advancement increment of a recording medium advancement mechanism in accordance with the error signal computed in said computing step.

To provide the reference memory a value, a calibration procedure is provided. The playback signal quality is measured for different capstan advance increments. From the information gathered over a range of capstan advance increments, the best signal is identified. A specific time value is associated with the selected capstan advance increment that produces the best read signal and it is stored in the comparison means reference memory. The signal quality can be determined in several ways. Some of these ways are signal strength 6, signal error rate 14, and any combination of signal strength and signal error rate. It is generally preferred to use signal strength for analog information and signal error rate for digital information, although it is possible to use a combination of the two.

It is therefore a third aspect of the invention to provide a value to a reference memory. A method of calibrating information track spacing to produce a reference to be used in an information tracking system which comprises:

a) a recording step for recording a histogram of playback signal quality versus index signal to synchronization signal delay time;
b) determining from said histogram the best delay time value; and
c) storing said delay time value in a reference memory for use with said information tracking system is included in the invention.

The inventor claims:

1. A method of calibrating information track spacing to produce a reference value to be used in an information tracking system which comprises:

a) a recording step for recording a histogram of playback signal quality versus recording medium advance distance;
b) determining from said histogram the best advance distance value; and
c) storing said advance distance value in a reference memory for use with said information tracking system.

2. A method of claim 1 wherein the recording step further comprises:

a) recording the playback signal quality; and
b) increasing the recording medium advance value incrementally.

3. A method of claim 2 wherein said playback signal quality is determined by the amplitude of said playback signal.

4. A method of claim 2 wherein said playback signal quality is determined by the error rate of said playback signal.

* * * * *